Dec. 7, 1954

M. L. HUFF 2,696,375

ENSILAGE CUTTER AND LOADER

Filed Aug. 24, 1953

INVENTOR.
MERLIN L. HUFF.
BY
Scott L. Howiel
ATTORNEY.

Dec. 7, 1954

M. L. HUFF 2,696,375

ENSILAGE CUTTER AND LOADER

Filed Aug. 24, 1953

INVENTOR.
MERLIN L. HUFF.
BY
ATTORNEY.

United States Patent Office 2,696,375
Patented Dec. 7, 1954

2,696,375

ENSILAGE CUTTER AND LOADER

Merlin L. Huff, Buckeye, Ariz.

Application August 24, 1953, Serial No. 376,077

3 Claims. (Cl. 262—9)

This invention concerns an improved ensilage cutter and loader.

More particularly this invention pertains to machines for cutting, removing and conveying ensilage from trench silos.

Where ensilage is cut and stored in open earth trench silos which are below ground level it has heretofore been necessary to cut and loosen the ensilage by hand and convey it to vehicles in which it is to be removed by any means available. Some mechanisms have been tried and others suggested which make use of a form of screw conveyor which will feed the ensilage onto a belt conveyor. These devices were found objectionable because it was necessary to cut and loosen the ensilage by hand or with auxiliary cutting and loosening mechanism before it could be handled by the screw conveyor.

In view of the foregoing, one of the objects of this invention is the provision of an ensilage cutter which will not only loosen and cut the compacted ensilage but will also convey it to a vehicle in which it can be transported.

Another object of this invention is to provide an ensilage cutter consisting of two spiral conveyors having their spirals pitched in opposite directions and operating in a trough in order to carry the ensilage to a centrally positioned conveyor leading to the haulage vehicle; said spiral conveyors being arranged to act as cutters to cut and loosen the compacted ensilage as well as to convey it to a centrally positioned belt conveyor leading to the vehicle to be loaded.

A still further object is the provision of spiral ensilage conveyors and cutters held in a frame work so that they can be forced into the bottom of compacted trenched ensilage and then raised to the top of the ensilage cutting and loosening the ensilage during the raising operation.

A still further object is the provision of a pivotally supported trough or shield, enclosing the rear portion of said spiral ensilage cutters, arranged so that it can be positioned below said cutters to catch all ensilage loosened, and so that its front edge may be maintained close to the compacted ensilage throughout the entire upward cutting and loading motion of the cutters and conveyors.

Other objects will appear hereinafter.

I attain the foregoing objects by means of the devices, parts, and combination of parts illustrated in the accompanying drawings in which—

Figure 1:
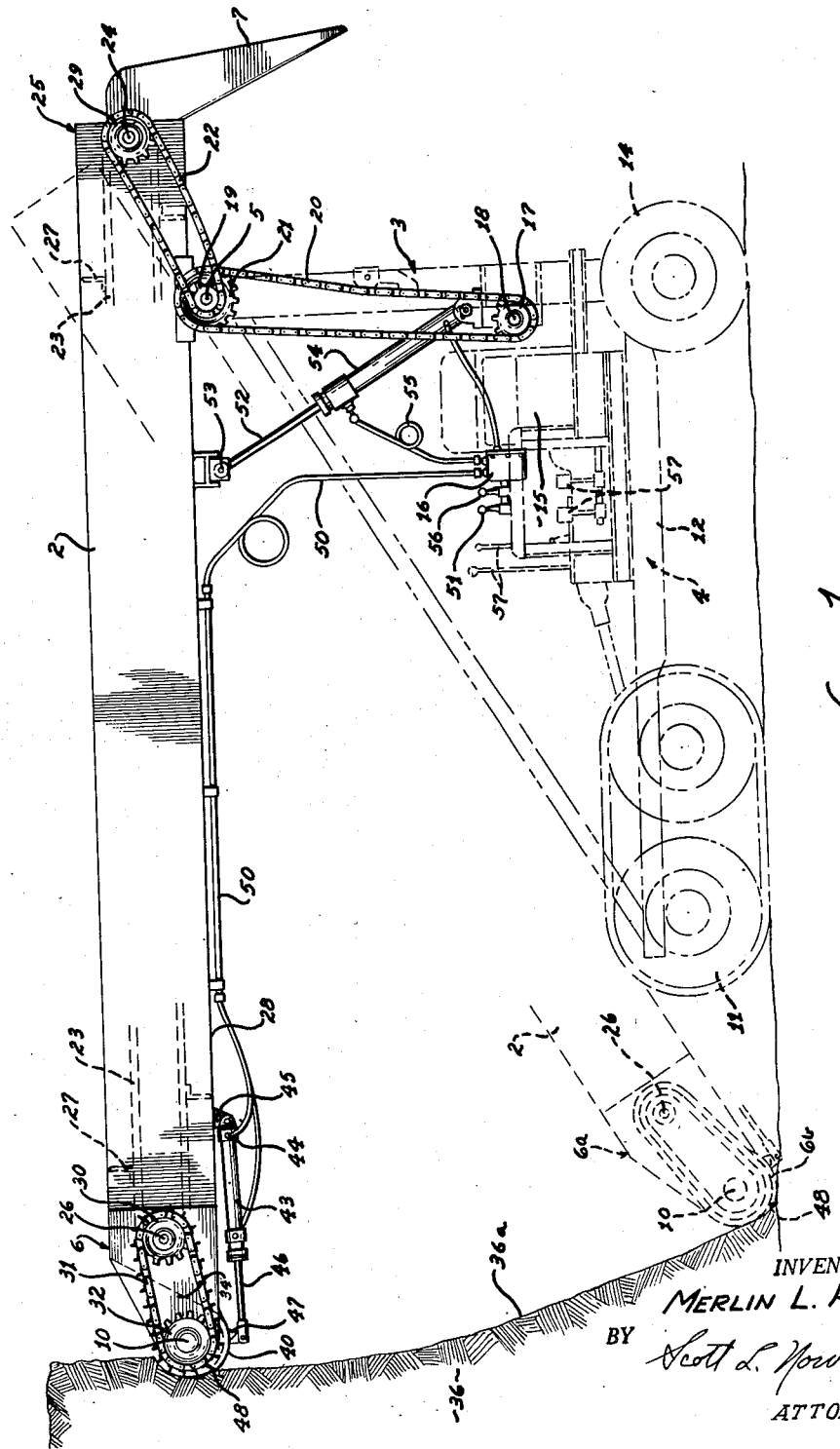
Figure 1 is a side elevational view of my improved ensilage cutter and conveyor.

Referring to Figure 1 of the drawings the tubular conveyor body 2 is pivotally mounted near its rear or delivery end on a frame 3 extending upwardly from a self-propelled vehicle 4 by means of a transverse shaft 5.

An ensilage cutting head 6 is at the outer end of the conveyor body 2 and a delivery chute 7 at its inner or delivery end. Spiral ensilage cutters 8 and 9 operate in the front part of the cutting head on transverse shaft 10.

The vehicle 4 includes forward driving wheels 11 on frame 12, rear steering wheels 14 and an engine 15, including conventional driving and control mechanism. Since the vehicle and its engine are accessory to the invention these parts are shown in dotted outline in Figure 1.

For the purpose of operating the conveyor body 2, and other parts essential to the ensilage cutting mechanism, engine 15 drives an oil pump 16, and a sprocket 17 on shaft 18 through suitable gearing and clutch mechanism. Chain 20 runs over sprocket 17 and drives sprocket 21 on shaft 5. This shaft is live and acts not only as a pivot shaft, but also as a drive shaft for operating the conveyor mechanism and cutting head mechanism.

Within the tubular conveyor body 2, which has a rectangular cross section, there is an endless conveyor chain 23 which runs on sprockets on transverse driving shaft 24 near the inner end 25 of the body and a driven shaft 26 at the outer end of the body. Conveyor chain 23 carries a number of transverse slats 27 which act as pushers or scrapers and convey cut and loosened ensilage rearwardly along the bottom 28 of the body 2 toward delivery chute 7.

Figures 2, 3:
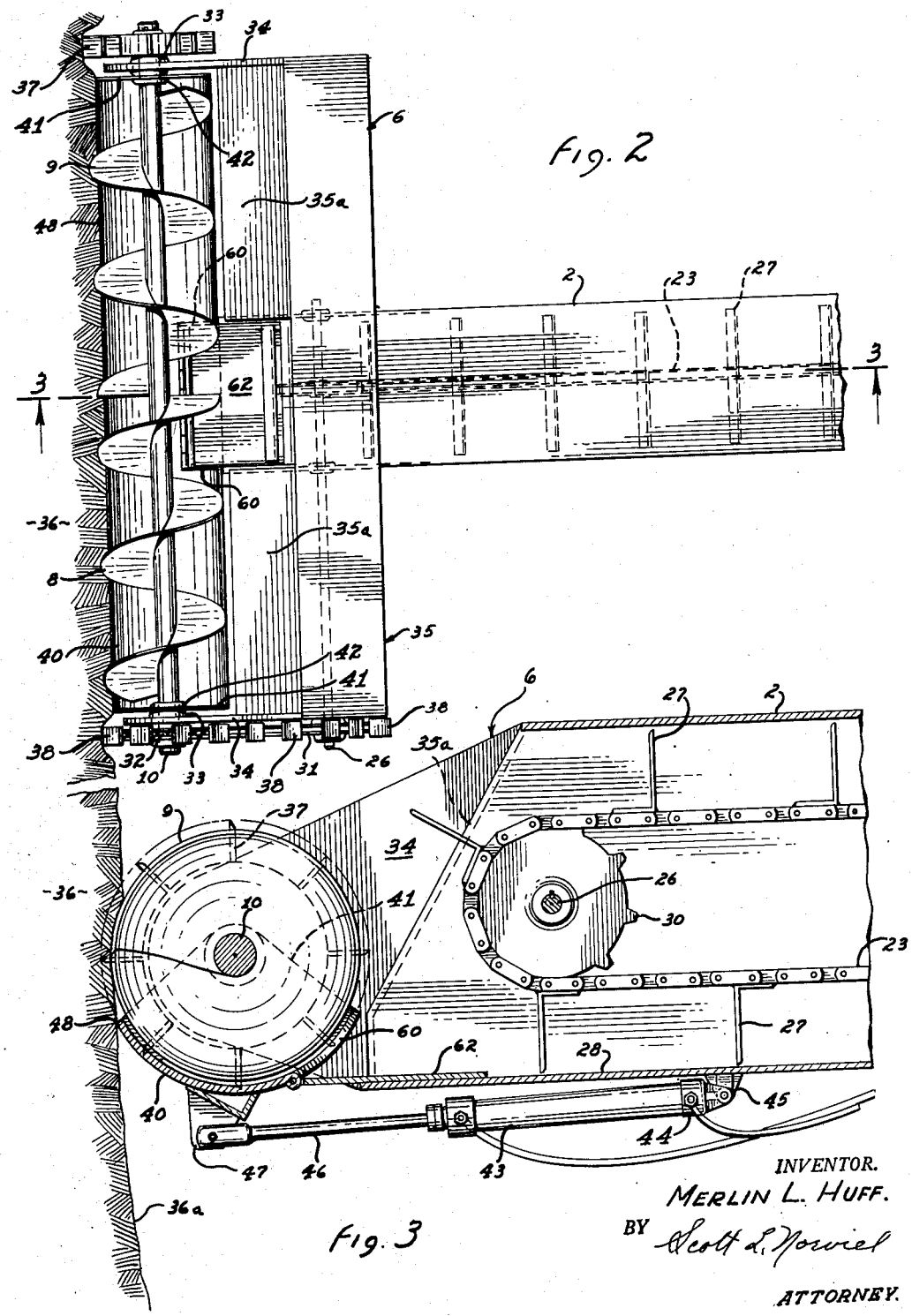
Figure 2 is a plan view thereof.
Figure 3 is a vertical section taken through the spiral cutter and conveyor assembly substantially on line 3—3 of Figure 2 and drawn on a somewhat enlarged scale.

Chain 22 runs over sprocket 29 on the near end of driving shaft 24 and over a sprocket 19 on shaft 5. The near end of driven shaft 26, as viewed in Figure 1, carries a sprocket 30 on which chain 31 runs and drives sprocket 32 on transverse cutter shaft 10. As shown in Figure 2 cutters 8 and 9 have their helices pitched in opposite directions, and when shaft 10 is rotated counterclockwise, as viewed in Figure 1 tend to force loosened ensilage toward the center of shaft 10.

Shaft 10 is journalled near its end portions in bearings 33 set in side plates 34 of cutter head frame 35. Transverse frame plates 35a form enclosing shields and supports for plates 34, and are secured to and supported on the outer end of conveyor body 2.

To enable the plates 34 to be forced into compacted ensilage 36 I provide a toothed wheel 37 at the right end of shaft 10, Figure 2; and add outwardly extending cutting teeth 38 to the links of chain 31 on the left hand side of head 6.

The cutters 8 and 9 are partially enclosed by arcuate trough 40. This has vertical supporting plates 41 at each end which are journalled by bearings 42 on shaft 10 and disposed within plates 34. Trough 40 swings in an arcuate path beneath these cutters. In order to control its position I provide a hydraulic cylinder 43 having its inner end 44 pivotally attached to lug 45 on the under side of conveyor body 2 and its piston rod 46 connected to a radially extending lug 47 on the under surface of trough 40. Extension of the piston rod of this cylinder will swing trough 40 forwardly and bring its forward edge or lip 48 into substantial contact with compacted ensilage 36. As head 6 is raised during the cutting operation, lip 48 may be extended by forcing piston rod 46 from cylinder 43. Operation of the piston is attained by forcing oil under pressure from pump 16 into or drawing it from the ends of the cylinder through tubes 50 as controlled by double acting valve 51.

A notch 60 is cut in the rear edge of trough 40 at a position adjacent the outer end opening of conveyor body 2. A plate 62 is hinged to the bottom of this notch and extends into the outer end of the conveyor body where it rests on the bottom plate 28 and is disposed in slidable relation therewith. As the trough is rocked or swung the plate extends into or is withdrawn from the conveyor body and affords a supporting platform for loosened ensilage as it is moved into the conveyor.

Pivotal motion of conveyor body 2 on shaft 5 is provided by piston rods 52 having their outer ends hinged to the bottom of the conveyor at 53 and operating in hydraulic cylinders 54, pivotally attached to portions of the uprights of frame 3. These cylinders are connected by tubing 55 to pump 16, and their operation controlled by valve 56.

The extension of piston rods 52 raises the outer end of body 2 and cutting head 6 upward, and retraction of these rods lowers these parts.

It is to be noted that valves 51 and 56 are conveniently grouped near engine 15 and pump 16 together with other vehicle controls 57.

Modern farming practice indicates that ensilage 36 stored and compacted in earthen trenches, must be cut and loosened to make removal possible. In operating this machine the vehicle is moved toward the wall 36a of compacted ensilage 36. The cutting head 6 is lowered to the position indicated by dotted outlines 6a, Figure 1, using valve 56. The helical cutters are set in motion, being driven from shaft 17 through the several chains and sprockets, as above explained, and revolve in a counterclockwise direction. When the spiral edges of the cutters 8 and 9 are forced into the compacted ensilage it is cut and loosened and falls into trough 40. The cutters then act as screw conveyors and move the ensilage in the trough to its center portion where it is crowded rearward over platform plate 62 toward the open outer end of the conveyor body. From this position the ensilage is picked up by the slats 27 and conveyed to the delivery end of the conveyor body, and to chute 7 from which it may be loaded into any desired conveyance.

Since the front ends of the cutter head side plates 34 engage the wall 36a of compacted ensilage and impede the entrance of the cutter head into the ensilage it is necessary to cut away ensilage on each outer side of these plates. Toothed wheel 37 serves this purpose on the right hand side of the head, and chain 31 with cutters 38 acts in the same way on the left side. These lateral cutters clear the way for the frame parts so that the spiral cutters are free to attack the ensilage.

At the bottom of the cutting movement trough 40 is retracted as indicated at 6a so that the cutters 8 and 9 may be brought close to the base of the compressed ensilage. The bottom of the trench serves the purpose of the trough 40 insofar as it catches and holds loosened ensilage so the spiral cutters, acting as conveyors, can move it inward toward plate 62. Thereafter, as the cutting head moves upward in an arc the lip 48 of trough 40 is moved and kept close to the wall 36a. In this way trough 40 catches substantially all ensilage loosened and minimizes waste as the operator raises the cutting head, controlling its movement by valve 56, he advances vehicle 4 and keeps it in proper forward position by the use of controls 57.

From the foregoing it will be noted and understood that the ensilage is loosened, conveyed and loaded without the need for hand labor, and in a rapid and efficient manner.

I claim:

1. In an ensilage cutter and loader for cutting compacted ensilage from trench silos and conveying the loosened ensilage into vehicles, including a self propelled directable vehicle having a body, with a front end and a rear end, an engine, and a frame extending upwardly from the rear end of said body, the combination therewith of a tubular conveyer body having a front end and a rear end pivotally supported at its rear end on said frame and extending forward over and ahead of said vehicle body, a cutting head including a transversely extending frame affixed to the front end of said tubular conveyer body and end plates supporting bearings, manually controlled mechanism powered by said vehicle engine for raising and lowering the front end of said conveyer body, a conveyer chain operating longitudinally in said conveyer and driven by said vehicle engine, a transverse shaft journalled in end plates of said cutting head driven by said vehicle engine, ensilage cutters on said transverse shaft having spiral cutting edges of opposite pitch acting as screw conveyers conveying ensilage toward the center of said transverse shaft, an arcuate conveyer trough having end plates journalled and supported adjacent the end portions of said transverse shaft, a manually controlled hydraulically operated piston mechanism swinging said trough beneath and in back of said spiral cutters and screw conveyers; and a plate hinged to the central portion of said trough and extending into the open outer end of said tubular conveyer body forming a conveying platform from said trough to said tubular conveyer body, and toothed cutters on the outer ends of said transverse shaft loosening ensilage on each side of said cutter head.

2. In an ensilage cutter and loader for cutting compacted ensilage from trench silos and conveying the loosened ensilage into vehicles, including a self propelled directable vehicle having a body, with a front end and a rear end, an engine, and a frame extending upwardly from the rear end of said body, the combination therewith of a tubular conveyer body having a front end and a rear delivery end having a loading chute pivotally supported adjacent its rear end on said frame and extending forward over and ahead of said vehicle body, a cutting head including a transversely extending frame affixed to the front end of said tubular conveyer body and end plates supporting bearings, manually controlled mechanism powered by said vehicle engine for raising and lowering the front end of said conveyer body, a conveyer chain operating longitudinally in said conveyer conveying cut ensilage from the front end of said conveyer body to the rear end thereof and driven by said vehicle engine, a transverse shaft journalled in end plates of said cutting head driven by said vehicle engine, ensilage cutters on said transverse shaft having spiral cutting edges of opposite pitch acting as screw conveyers conveying ensilage toward the center of said transverse shaft, an arcuate conveyer trough having a notch in the central portion of its rear edge end plates journalled and supported adjacent the end portions of said transverse shaft, a manually controlled hydraulically operated piston mechanism swinging said trough beneath and in back of said spiral cutters and screw conveyers; and a plate hinged in the said notch in the central portion of said trough, extending into the open outer end of said tubular conveyer body resting on the bottom thereof and forming a conveying platform from said trough to said tubular conveyer body, and toothed cutters on the outer ends of said transverse shaft loosening ensilage on each side of said cutter head.

3. In an ensilage cutter and loader of the type described, a tubular conveyer body having a front end with a transverse cutting head thereon and a rear end with a transverse pivotal support thereon, a conveyer operating from front to rear within said conveyer body; said conveyer head including transverse plates, end plates, bearings in said end plates, a transverse shaft journalled in said bearings, combination spiral ensilage cutters and screw conveyers on said shaft, means for rotating said shaft so that the outer front edges of said cutters attack said ensilage with a downward arcuate motion, end cutters on said shaft clearing ensilage from in front of the end plates of said cutting head, and an arcuate transverse conveyer trough swingably disposed beneath said spirial cutters having a front edge substantially contacting ensilage being cut and a notched rear edge hingedly supporting a platform communicating with said conveyer trough, and manually controlled mechanism for swinging and positioning said trough.

References Cited in the file of this patent

UNITED STATES PATENTS

| Number | Name | Date |
|---|---|---|
| 779,442 | Richmond et al. | Jan. 10, 1905 |
| 1,811,927 | Halleck | June 30, 1931 |
| 1,882,629 | James | Oct. 11, 1932 |
| 2,669,338 | Kling | Feb. 16, 1954 |